United States Patent
Shih et al.

(10) Patent No.: US 12,467,926 B2
(45) Date of Patent: Nov. 11, 2025

(54) METHOD FOR DETERMINING IMMUNE COMPETENCE AGAINST SEVERE ACUTE RESPIRATORY SYNDROME CORONAVIRUS 2

(71) Applicants: CHANG GUNG UNIVERSITY, Taoyuan (TW); Chang Gung Memorial Hospital, Linkou, Taoyuan (TW)

(72) Inventors: Shin-Ru Shih, New Taipei (TW); Kuan-Ting Liu, Taoyuan (TW); Guang-Wu Chen, New Taipei (TW); Chung-Guei Huang, Taoyuan (TW); Kar-Yee Yu, Taoyuan (TW); Hou-Chen Lee, Taoyuan (TW); Peng-Nien Huang, Taoyuan (TW); Yu-Nong Gong, Taoyuan (TW); Rei-Lin Kuo, Taoyuan (TW); Chih-Ching Wu, Taoyuan (TW); Yu-An Kung, Taoyuan (TW); Sheng-Yu Huang, Taoyuan (TW)

(73) Assignees: CHANG GUNG UNIVERSITY, Taoyuan (TW); Chang Gung Memorial Hospital, Linkou, Taoyuan (TW)

( * ) Notice: Subject to any disclaimer, the term of this patent is extended or adjusted under 35 U.S.C. 154(b) by 873 days.

(21) Appl. No.: 17/470,283

(22) Filed: Sep. 9, 2021

(65) Prior Publication Data

US 2022/0074939 A1  Mar. 10, 2022

Related U.S. Application Data

(60) Provisional application No. 63/076,533, filed on Sep. 10, 2020.

(51) Int. Cl.
*A61K 39/215* (2006.01)
*G01N 33/538* (2006.01)
*G01N 33/543* (2006.01)
*G01N 33/569* (2006.01)
*G06N 7/00* (2023.01)

(52) U.S. Cl.
CPC ..... *G01N 33/56983* (2013.01); *G01N 33/538* (2013.01); *G01N 33/54366* (2013.01); *G01N 2800/26* (2013.01); *G06N 7/00* (2013.01)

(58) Field of Classification Search
None
See application file for complete search history.

(56) References Cited

PUBLICATIONS

Chen W. et al. SARS-CoV-2 neutralizing antibody levels are correlated with severity of COVID-19 pneumonia. Biomedicine & Pharmacotherapy 130 (2020) 110629. Available online Aug. 13, 2020.*

Chen X. et al. Disease severity dictates SARS-CoV-2-specific neutralizing antibody responses in COVID-19. Signal Transduction and Targeted Therapy (2020) 5:180. Published on line Sep. 2, 2020.*

\* cited by examiner

*Primary Examiner* — Nianxiang Zou
(74) *Attorney, Agent, or Firm* — Law Offices of Albert Wai-Kit Chan, PLLC

(57) ABSTRACT

A method for determining immune competence against severe acute respiratory syndrome coronavirus 2 (SARS-CoV-2) includes obtaining a blood sample from a subject in need thereof, detecting, in the blood sample, levels of binding antibodies against SARS-CoV-2 spike S1 protein and its receptor binding domain (RBD), and calculating a weighted value using a regression model. Another method for determining immune competence against SARS-CoV-2 is also disclosed.

4 Claims, 1 Drawing Sheet

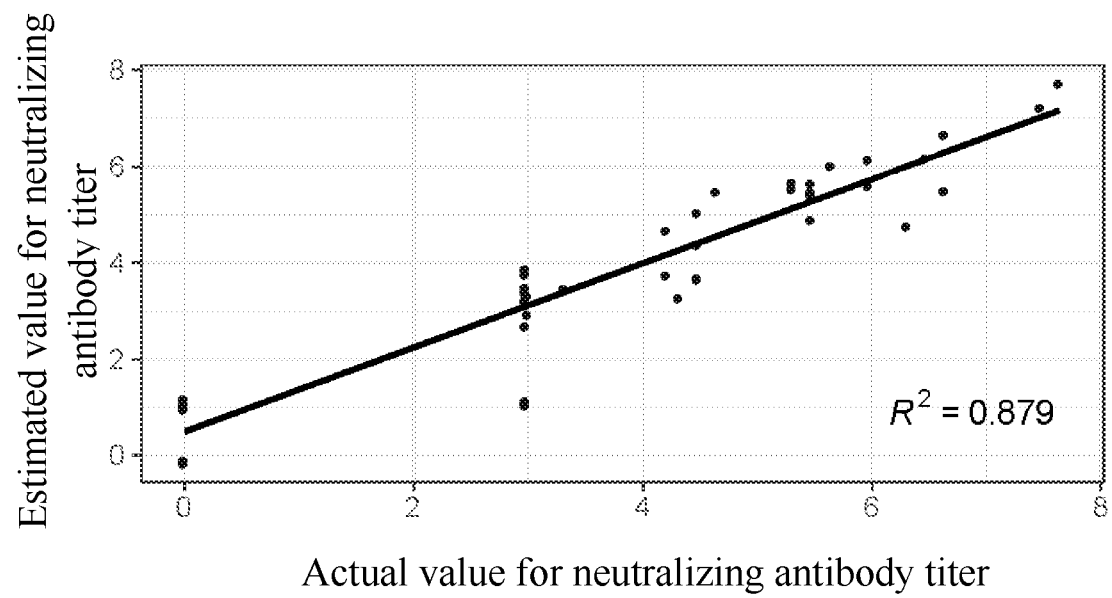

METHOD FOR DETERMINING IMMUNE COMPETENCE AGAINST SEVERE ACUTE RESPIRATORY SYNDROME CORONAVIRUS 2

CROSS-REFERENCE TO RELATED APPLICATION

This application claims priority of U.S. Provisional Patent Application Ser. No. 63/076,533, filed on Sep. 10, 2020.

FIELD

The disclosure relates to a method for determining immune competence against severe acute respiratory syndrome coronavirus 2 (SARS-CoV-2), more particularly to a method for determining immune competence against SARS-CoV-2 based on levels of binding against SARS-CoV-2 spike S1 protein and its receptor binding domain (RBD) using a regression model.

BACKGROUND

Coronavirus disease 2019 (COVID-19) is a contagious disease, the outbreak of which began at the end of 2019. COVID-19 is caused by severe acute respiratory syndrome coronavirus 2 (SARS-CoV-2). There has been no effective approach for treating COVID-19. Instead, to stop or alleviate the outbreak of COVID-19, vaccination for enhancing the immune competence against SARS-CoV-2 seems promising.

In order to evaluate a subject's immune competence against SARS-CoV-2, a virus neutralization test is conventionally used to detect, in the subject's blood, the titer of a neutralizing antibody against SARS-CoV-2. However, such test requires cultivation of SARS-CoV-2 for several days, which is dangerous and time-consuming.

Even though kits for detecting an antibody against SARS-CoV-2 (e.g. SARS-CoV-2 Rapid Antibody Test from Roche) are commercially available in the market, these kits mainly serve to detect, in a blood sample, a binding antibody (i.e. non-neutralizing antibody) binding to a SARS-CoV-2 protein (such as the spike protein), not a neutralizing antibody that neutralizes the effect of SARS-CoV-2. Therefore, these kits can only determine whether a subject has been infected with SARS-CoV-2 and had an immune response, and cannot determine whether the subject has immune competence against SARS-CoV-2.

In addition, SARS-CoV-2 Surrogate Virus Neutralization Test Kit (GenScript) is designed based on the interaction between the receptor-binding domain (also referred to as RBD protein) on the S1 subunit of the spike protein (also referred to as S1 protein) of SARS-CoV-2 and the ACE2 (angiotensin-converting enzyme 2) receptor of a host cell. Specifically, the a kit determines, through competitive binding assay, the ability to inhibit binding of a RBD-horseradish peroxidase (HRP) fusion protein to the ACE2 receptor. In other words, the inhibition ability determined is more close to the ability to inhibit the ability to bind to the RBD, and hence cannot serve to directly represent the ability to neutralize SARS-CoV-2.

Therefore, there is still an urgent need to develop an approach to safely and promptly determine immune competence against SARS-CoV-2, so as to evaluate risks of infection for various subjects and the protective potency of different vaccines.

SUMMARY

Therefore, in a first aspect, the present disclosure provides a method for determining immune competence against severe acute respiratory syndrome coronavirus 2 (SARS-CoV-2), which can alleviate at least one of the drawbacks of the prior art.

The method includes the following steps. A blood sample is obtained from a subject in need thereof. Levels of binding antibodies against SARS-CoV-2 spike subunit 1 (S1) protein and receptor binding domain (RBD) protein thereof are detected in the blood sample. A weighted value is calculated by substituting the levels of the binding antibodies into a regression model. The subject's immune competence against SARS-CoV-2 is determined based on the weighted value. The weighted value and the subject's immune competence against SARS-CoV-2 are positively correlated.

In a second aspect, the present disclosure provides another for determining immune competence against SARS-CoV-2, which can alleviate at least one of the drawbacks of the prior art.

The another method includes the following steps. A blood sample from a subject in need thereof is obtained. Levels of binding antibodies against SARS-CoV-2 spike subunit 1 (S1) protein and receptor binding domain (RBD) protein thereof are detected in the blood sample. A weighted value is calculated by substituting the levels of the binding antibodies into a regression model. The weighted value is compared with a predetermined standard. When the weighted value is higher than the predetermined standard, the subject is determined as having a neutralizing antibody titer against SARS-CoV-2 which is indicative of immune competence against SARS-CoV-2.

BRIEF DESCRIPTION OF THE DRAWINGS

Other features and advantages of the disclosure will become apparent in the following detailed description of the embodiments with reference to the accompanying drawings, of which:

FIG. 1 shows a result obtained by comparing the actual value for the neutralizing antibody titer against severe acute respiratory syndrome coronavirus 2 (SARS-CoV-2) and the estimated value for the neutralizing antibody titer against SARS-CoV-2 calculated using a regression model.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for determining immune competence against severe acute respiratory syndrome coronavirus 2 (SARS-CoV-2), which includes the following steps.

A blood sample is obtained from a subject in need thereof. Levels of binding antibodies against the subunit 1 (S1) of the spike protein of SARS-CoV-2 (also referred to as S1 protein) and the receptor binding domain (RBD) of the S1 protein (also referred to as RBD protein) are detected in the blood sample. A weighted value is calculated by substituting the levels of the binding antibodies into a regression model. The subject's immune competence against SARS-CoV-2 is determined based on the weighted value. The weighted value and the subject's immune competence against SARS-CoV-2 are positively correlated.

In certain embodiments, the weighted value is an estimated value for a neutralizing antibody titer against SARS-CoV-2.

According to the present disclosure, the levels of the binding antibodies may be detected using any S1 protein and RBD protein that are commercially available or expressed and purified on one's own, and the detection may be conducted using any technique well-known in the art (for example, enzyme-linked immunosorbent assay (ELISA)). In certain embodiments, the levels of the binding antibodies are titers of the binding antibodies.

According to the present disclosure, the regression model may be a model established by subjecting levels of binding antibodies against the S1 protein and RBD protein of SARS-CoV-2 and a level of neutralizing antibodies against SARS-CoV-2, which are determined from a subject having neutralizing antibodies against SARS-CoV-2, to any suitable regression analysis. The levels of the binding antibodies serve as independent variables, and the level of the neutralizing antibodies serves as a dependent variable. The subject having neutralizing antibodies against SARS-CoV-2 may be a subject who has been infected with SARS-CoV-2, or a subject who has been inoculated with a vaccine against SARS-CoV-2.

In certain embodiments, the regression model is a generalized additive model, which may be built using a technique well-known and commonly used in the art. In this regard, reference may be made to, for example: Hastie, T. and Tibshirani, R. (1986), *Statistical Science,* 1:297-310; Hastie, T. and Tibshirani, R. (1990), Generalized Additive Models, New York: Chapman and Hall; and Wood, S. N. (2017), Generalized Additive Models: An Introduction with R, 2 edition. Chapman and Hall/CRC.

In other embodiments, the regression model is a linear regression model, which may be built using a technique well-known and commonly used in the art. For instance, the linear regression model may have the following equation (I):

$$A = -0.4306 + 0.4121 \times B + 2.8792 \times C \quad (I)$$

where A=weighted value (i.e. estimated value of neutralizing antibody titer against SARS-CoV-2), B=binding antibody titer against S1 protein, C=binding antibody titer against RBD protein.

According to the present disclosure, the blood sample may be serum which is obtained by subjecting whole blood of the subject to a separation treatment. Alternatively, the blood sample may be whole blood.

According to the present disclosure, suitable strains of SARS-CoV-2 include, but are not limited to, isolate Wuhan-hu-1 (wild-type), α-variant (B.1.1.7 lineage with or without E484K mutation), β-variant (B.1.351 lineage), γ-variant (P.1 lineage), and δ-variant (B.1.617.2 lineage). In certain embodiments, the strain of SARS-CoV-2 is isolate Wuhan-hu-1 (wild-type).

In addition, the present disclosure provides another method for determining immune competence against SARS-CoV-2.

The another method includes the following steps. A blood sample from a subject in need thereof is obtained. Levels of binding antibodies against the S1 protein and RBD protein are detected in the blood sample. A weighted value is calculated by substituting the levels of the binding antibodies into a regression model. The weighted value is compared with a predetermined standard. When the weighted value is higher than the predetermined standard, the subject is determined as having a neutralizing antibody titer against SARS-CoV-2 which is indicative of immune competence against SARS-CoV-2.

In certain embodiments, the weighted value is an estimated value for the neutralizing antibody titer against SARS-CoV-2, and the predetermined standard is a range, a numerical value, or a cutoff value of a neutralizing antibody titer against SARS-CoV-2 determined from a subject who has been inoculated with a vaccine against SARS-CoV-2. Alternatively, the predetermined standard is a range, a numerical value, or a cutoff value of a neutralizing antibody titer against SARS-CoV-2 determined from a subject who is considered as having protective immunity or sterilizing immunity against SARS-CoV-2.

As used herein, the term "protective immunity" means that when a subject is infected with SARS-CoV-2, such subject develops only mild to moderate clinical symptoms or no symptoms at all, and would not die.

As used herein, the term "sterilizing immunity" means that replication of SARS-CoV-2 can be completely prevented in a subject.

According to the present disclosure, the type of the blood sample, the detection of the levels of the binding antibodies, the selection of the regression model, and the suitable strains of SARS-CoV-2 are as described above.

Lastly, the present disclosure provides a kit for determining immune competence against SARS-CoV-2, which includes a reagent for detecting levels of binding antibodies against the S1 protein and RBD protein of SARS-CoV-2 in a blood sample obtained from a subject.

The disclosure will be further described by way of the following examples. However, it should be understood that the following examples are solely intended for the purpose of illustration and should not be construed as limiting the disclosure in practice.

EXAMPLES

Test Subjects and Serum Samples:

70 healthy test subjects participating in the study below were recruited under a protocol approved by the Chang Gung Medical Foundation Institutional Review Board. Exclusion criteria were applied to exclude any unsuitable candidate listed in Table 1 below.

TABLE 1

| | Exclusion criteria |
|---|---|
| 1 | Pregnanet women |
| 2 | Breastfeeding women |
| 3 | Smokers |
| 4 | Alcohol or drug abusers or addicts |
| 5 | Persons diagnosed with SARS-CoV-2 infection |

Informed consent was obtained from all the qualified healthy test subjects. Blood was collected from a respective one of the test subjects, followed by centrifugation at 4° C. and 2,000 rpm for 15 minutes. The resultant supernatant was collected to serve as a serum sample, and was subjected to cryopreservation at −80° C. before use.

In addition, serum samples collected from another 74 test subjects who had been recovered from SARS-CoV-2 infection were purchased from Access Biologicals LLC (such samples are referred to as convalescent serum), and were subjected to cryopreservation at −80° C. before use.

When the serum samples of the test subjects were used in the following experiment, these samples were subjected to an inactivation treatment at 56° C. for 30 minutes using a technique well-known in the art.

General Experimental Materials:

1. Source and Cultivation of Vero E6 Cells

Vero E6 cells (CRL-1586) used in the example below were purchased from American Type Culture Collection, ATCC). The Vero E6 cells were cultivated in Minimum Essential Medium (MEM) (ThermoFisher, Cat. No. 11095080) supplemented with 2% (v/v) fetal bovine serum (FBS) under cultivation conditions of 37° C. and 5% $CO_2$.

2. Source and Cultivation of SARS-CoV-2

SARS-CoV-2 used in the example below (strain name: CGUMH-CGU-04; GISAID (Global Initiative on Sharing All Influenza Data) accession number: EPI_ISL_415742) was obtained from the Linkou Chang Gung Memorial Hospital Taiwan (Taoyuan City, Taiwan). SARS-CoV-2 was proliferated using the Vero E6 cells described in section 1 above. The viral titer was determined as 50% tissue culture infectious dose ($TCID_{50}$) per unit volume through a plaque assay.

3. Viral Proteins of SARS-CoV-2

The following viral proteins of SARS-CoV-2 used in the example below were purchased from Sino Biological Inc.: the S1 subunit of the spike protein (also referred to as S1 protein) and the receptor binding domain (also referred to as RBD protein) of the S1 protein.

General Procedures:

1. Regression Analysis:

Regression analysis was conducted using R statistical software based on a generalized additive model or a linear regression model established in the example below.

Example 1. Correlation Analysis for Binding Antibodies Against SARS-CoV-2 Viral Proteins and Neutralizing Antibodies Against SARS-CoV-2

Experimental Procedure:

A. Analysis for Titers of Binding Antibodies Against SARS-CoV-2 Viral Proteins 44 test serum samples were randomly selected from the serum samples of the 144 test subjects. The titers of the binding antibodies in the respective test serum sample against the S1 protein and RBD protein of SARS-CoV-2 were analyzed through enzyme-linked immunosorbent assay (ELISA).

A respective one of the S1 protein and RBD protein was dissolved in phosphate buffer saline (PBS) to prepare a S1 protein solution and a RBD protein solution, each of which had a final protein concentration of 2 μg/mL. 100 μL of the S1 protein solution and 100 μL of the RBD protein solution were added into corresponding wells of a 96-well plate for coating at room temperature overnight. The liquid in the respective well was removed, followed by washing with Wash Buffer (R&D, 895003). 300 μL of StartingBlock™ T20 (PBS) Blocking Buffer was added into the respective well to conduct blocking at room temperature for 1 hour. Thereafter, the liquid in the respective well was removed, followed by washing with Wash Buffer.

A portion of the respective test serum sample was subjected to 200-fold dilution using StartingBlock™ T20 (PBS) Blocking Buffer to form a respective diluted test serum sample. 100 μL of the respective diluted test serum sample was added into the corresponding well, followed by cultivation at room temperature for 1 hour. The liquid in each well was removed, followed by washing with Wash Buffer. Horseradish peroxidase (HRP)-conjugated anti-human (IgG, IgM, IgA) antibody (Abcam, Cat. No. ab102420) was subjected to 10,000-fold dilution using StartingBlock™ T20 (PBS) Blocking Buffer. 100 μL of the resultant diluted antibody solution was added into each well, followed by cultivation at room temperature for 1 hour.

The liquid in the respective well was removed, followed by washing with Wash Buffer. 100 μL of TMB peroxidase substrate (R&D) was added into the respective well, and the enzymatic reaction resulting in color development were allowed to proceed at room temperature for 5 minutes. Subsequently, 50 μL of Stop Solution (R&D system Co., Ltd.) was added to terminate the reaction. Lastly, the absorbance at 450 nm ($A_{450}$) of the respective well was determined using a microplate reader (Synergy™ 2). Such $A_{450}$ determined was considered as the titer of the binding antibodies in the test serum sample. In other words, the higher the $A_{450}$, the higher the titer of the binding antibodies.

B. Analysis for Titer of Neutralizing Antibodies Against SARS-CoV-2

The 44 test serum samples selected in section A of this example were further subjected to analysis of neutralizing antibody titer through virus neutralization assay.

A portion of the respective test serum sample was subjected to 2-fold serial dilution (with dilution ratios from 1/2 to $1/2^{13}$). The respective diluted test serum sample was added into a corresponding one of wells of a 96-well plate. An equal volume of a solution of SARS-CoV-2 (with a $TCID_{50}$ titer of 100) was added into each well, followed by cultivation at 37° C. for 2 hours. The Vero E6 cells were added into each well at $2.5 \times 10^4$ cells/well, followed by cultivation under conditions of 37° C. of 5% $CO_2$ for 5 days. 10% formaldehyde was added into each well for fixation. Thereafter, 0.1% crystal violet was used for staining. Finally, Reed-Muench method was applied to determine the dilution of the test serum sample for inhibiting 50% of the cytopathic effect (CPE). The inverse of such dilution was considered as the titer of neutralizing antibodies in the test serum sample. In other words, the higher the inverse, the higher the neutralizing antibody titer.

C. Regression Analysis

The binding antibody titers against different viral proteins of SARS-CoV-2 were used as independent variables, and the neutralizing antibody titer against SARS-CoV-2 was used as a dependent variable. A generalized additive model analysis was conducted to analyze the correlation with the predictor variable, so as to establish a generalized additive model (i.e. a predictive model) that can use binding antibody titer against a particular viral protein of SARS-CoV-2 to predict a neutralizing antibody titer against SARS-CoV-2.

The accuracy of the generalized additive model established based on different viral proteins was evaluated through an L2 norm and a coefficient of determination ($R^2$). The lower the L2 norm and the higher the $R^2$, the better the ability of the generalized additive model to predict. The result obtained is shown in Table 2 below.

TABLE 2

| Viral protein for establishing generalized additive model | L2 norm | $R^2$ |
|---|---|---|
| S1 protein | 6.071 | 0.803 |
| RBD protein | 5.204 | 0.855 |
| S1 protein and RBD protein | 4.754 | 0.879 |

As shown in Table 2, compared to the model established based on the S1 protein only, surprisingly, the model established based on the S1 protein and the RBD protein (which is a part of the S1 protein) in combination was able to significantly improve the ability to predict.

In addition to the aforesaid generalized additive model analysis, a linear regression model analysis was similarly conducted to analyze the correlation with the predictor variable. The result thus obtained indicates that a linear regression model established based on the antibody titers against the S1 protein and RBD protein (such titers served as two variables) and having an equation (I) below was able to significantly improve the ability to predict (data not shown):

$$A=-0.4306+0.4121 \times B+2.8792 \times C \quad (I)$$

where A=weighted value (i.e. estimated value of neutralizing antibody titer against SARS-CoV-2)
B=binding antibody titer against S1 protein
C=binding antibody titer against RBD protein D. Verification of Regression Models of Present Disclosure In order to verify whether the regression models established in section C of this Example (i.e. the generalized additive model and linear regression model built based on the combination of the S1 protein and RBD protein) are satisfactory, another 44 test serum samples (i.e. not the 44 test serum samples used in sections A and B of this example) were selected and subjected to determination of binding antibody titers against the S1 protein and RBD protein according to the procedure described in section A of this example. Subsequently, the titers determined were substituted into the generalized additive model established based on the combination of the S1 protein and RBD protein in section C of this example, so as to obtain an estimated value for the neutralizing antibody titer against SARS-CoV-2. In addition, the another 44 test serum samples were also subjected to determination of a neutralizing antibody titer against SARS-CoV-2 according to the procedure described in section B of this example, thereby obtaining an actual value for the neutralizing antibody titer against SARS-CoV-2. The actual value and the estimated value were subjected to comparison.

The comparison result is shown in FIG. 1. As shown in FIG. 1, the estimated and actual values for the neutralizing antibody titer against SARS-CoV-2 are highly correlated with each other.

In view of the aforesaid experimental results, it can be concluded that the titers of the binding antibodies in serum against the S1 protein and RBD protein of SARS-CoV-2 can be applied together in combination with the titer of the neutralizing antibodies in serum against SARS-CoV-2 to establish a satisfactory regression model. Such regression model can be used to evaluate a neutralizing antibody titer and immune competence against SARS-CoV-2 for a test subject (e.g. a test subject who has been inoculated a vaccine against SARS-CoV-2), and it is hence not necessary to use viable viruses to conduct experiments, thereby greatly enhancing the efficiency and safety of the evaluation.

All patents and references cited in this specification are incorporated herein in their entirety as reference. Where there is conflict, the descriptions in this case, including the definitions, shall prevail.

While the disclosure has been described in connection with what are considered the exemplary embodiments, it is understood that this disclosure is not limited to the disclosed embodiments but is intended to cover various arrangements included within the spirit and of scope the broadest interpretation so as to encompass all such modifications and equivalent arrangements.

What is claimed is:

1. A method for determining immune competence against severe acute respiratory syndrome coronavirus 2 (SARS-CoV-2), comprising:
   obtaining a blood sample from a test subject in need thereof;
   detecting, in the blood sample, titers of binding antibodies against SARS-CoV-2 spike subunit 1 (S1) protein and receptor binding domain (RBD) protein thereof;
   calculating an estimated value of a neutralizing antibody titer against SARS-CoV-2 by substituting the titers of the binding antibodies into a linear regression model having the following equation (I):

$$A=-0.4306+0.4121 \times B+2.8792 \times C \quad (I)$$

where A=estimated value of neutralizing antibody titer against SARS-CoV-2
   B=binding antibody titer against S1 protein
   C=binding antibody titer against RBD protein;
   comparing the estimated value of the neutralizing antibody titer against SARS-CoV-2 with a predetermined standard obtained from a subject having protective immunity or sterilizing immunity against SARS-CoV-2,
   wherein when the estimated value of the neutralizing antibody titer against SARS-CoV-2 is less than the predetermined standard, the test subject is determined as having an insufficient neutralizing antibody titer against SARS-CoV-2 which is indicative of having neither protective immunity nor sterilizing immunity against SARS-CoV-2; and
   inoculating the test subject having neither protective immunity nor sterilizing immunity against SARS-CoV-2 with a vaccine against a SARS-CoV-2 variant, thereby increasing the test subject's immune competence.

2. The method as claimed in claim 1, wherein the blood sample is serum.

3. The method as claimed in claim 1, wherein the titers of the binding antibodies are detected using enzyme-linked immunosorbent assay.

4. The method as claimed in claim 1, wherein said SARS-CoV-2 variant is isolate Wuhan-hu-1 (wild-type), α-variant (B.1.1.7 lineage with or without E484K mutation), β-variant (B.1.351 lineage), γ-variant (P.1 lineage), or δ-variant (B.1.617.2 lineage).

* * * * *